United States Patent [19]

Vironneau

[11] 4,378,789
[45] Apr. 5, 1983

[54] SOLAR HEATING UNITS

[76] Inventor: Pierre Vironneau, Chemin des Palanques, Portet-sur-Garonne 31120, France

[21] Appl. No.: 284,524

[22] Filed: Jul. 17, 1981

Related U.S. Application Data

[63] Continuation of Ser. No. 12,128, Feb. 14, 1979, abandoned.

[30] Foreign Application Priority Data

Feb. 16, 1978 [FR] France .................................. 78 04996

[51] Int. Cl.³ ............................................... F24J 3/02
[52] U.S. Cl. ................................... 126/450; 126/444; 126/417
[58] Field of Search ............... 126/450, 417, 444, 449, 126/435; 165/135

[56] References Cited

U.S. PATENT DOCUMENTS

| | | | |
|---|---|---|---|
| 3,076,450 | 2/1963 | Gough et al. | 126/450 X |
| 3,986,491 | 10/1976 | O'Hanlon | 126/440 X |
| 4,010,733 | 3/1977 | Moore | 126/450 X |
| 4,033,325 | 7/1977 | Walker | 126/450 X |
| 4,098,265 | 7/1978 | Gravely | 126/450 |
| 4,099,517 | 7/1978 | McRae | 126/450 |
| 4,132,220 | 1/1979 | Thomasson | 126/450 |
| 4,279,243 | 7/1981 | Deakin | 126/450 |

*Primary Examiner*—James C. Yeung
*Assistant Examiner*—Randall L. Green
*Attorney, Agent, or Firm*—Young & Thompson

[57] ABSTRACT

Solar heating units comprise a flat transparent panel with an absorbing panel therebeneath to whose upturned edges the transparent panel is supportingly joined by a thermally polymerized elastomer.

5 Claims, 6 Drawing Figures

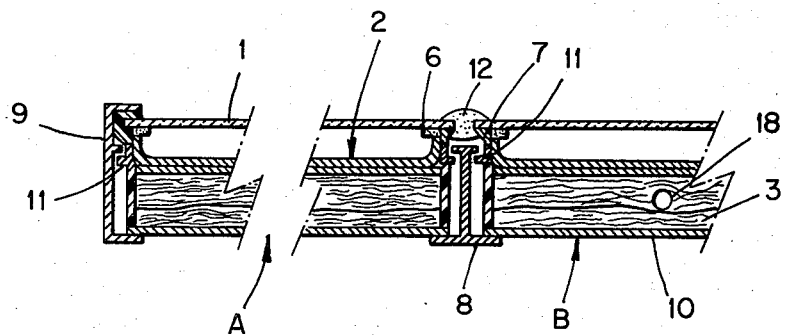
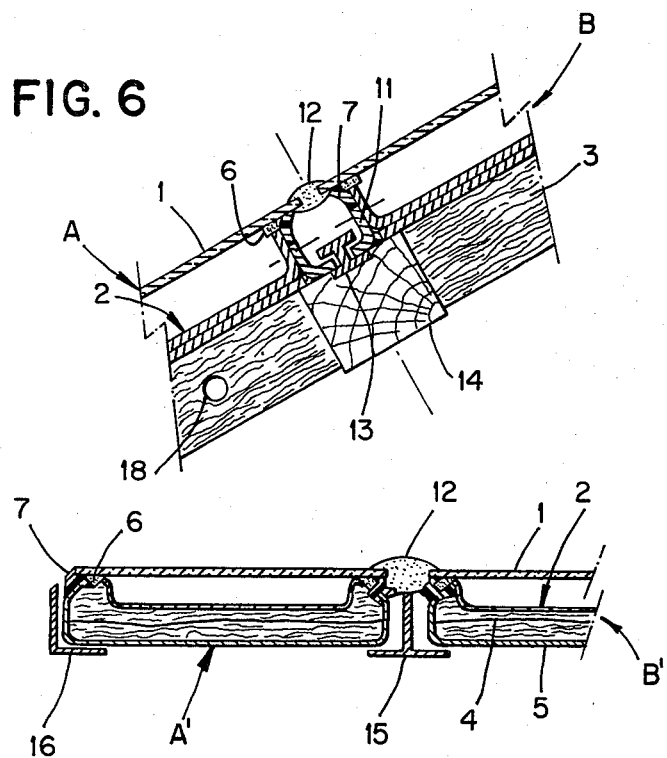

SOLAR HEATING UNITS

This application is a continuation of application Ser. No. 12,128, filed Feb. 14, 1979 abandoned.

The present invention relates to solar energy collecting devices.

Faulty sealing of solar collectors heretofore known, results in their low efficiency. These panels are generally located in atmosphere polluted with corrosive agents; and it has been noted that the absorbing panel associated with the transparent panels which form the collector or active part of the device, is often affected by chemical corrosion and hence by damage which is highly detrimental to its absorption capability.

It is an object of the present invention to solve this problem. It is also an object of the present invention to provide a high quality panel which will be easy to install and remove, easy to integrate into any desired solar heating system, and easy to position at any desired angle.

Briefly, the present invention is achieved by providing a flat transparent panel above an absorbing panel, the absorbing panel having upturned edges to which the transparent panel is peripherally joined by means of an elastomer, preferably a thermally polymerized elastomer, e.g. a silicone. Such binders have a certain elasticity and high resistance to deterioration and ensure gastight securement of the parts of the assembly together and so avoid the above disadvantages.

The invention also provides a thermal heat collector system comprised by a combination of units consisting mainly of insolation components as described above.

The collector units according to the present invention can be filled with a neutral or inert gas, e.g. nitrogen or argon, that is, a gas which does not physically affect solar radiation refraction and does not chemically react in the enclosure formed by the components.

Any conventional silicone elastomer binder in the form of a thermally polymerizable paste can be used on the periphery of the upper part of the margins of the insolation component. Such binders have substantial elasticity which permits thermal expansion of the components relative to each other, thereby avoiding damage to the parts even in the case of units of large area. The binder also damps shocks and vibrations and ensures fluidtightness of the assembly.

A plurality of units can be joined together by means of I-beams and E-beams which serve as framing sections. According to another embodiment, in which the insolation components are disposed in heat insulated casings, the units can be connected together by means of T-beams and L-beams that comprise framing sections.

Other objects, features and advantages of the present invention will become apparent from a consideration of the following description, taken in connection with the accompanying drawings, in which:

FIGS. 4 and 5 are cross-sectional views of two different embodiments of assemblies in which units according to the present invention can be used; and FIG. 6 is a fragmentary cross-sectional view of an assembly of units embodied in the roof of a building.

Figure 1:
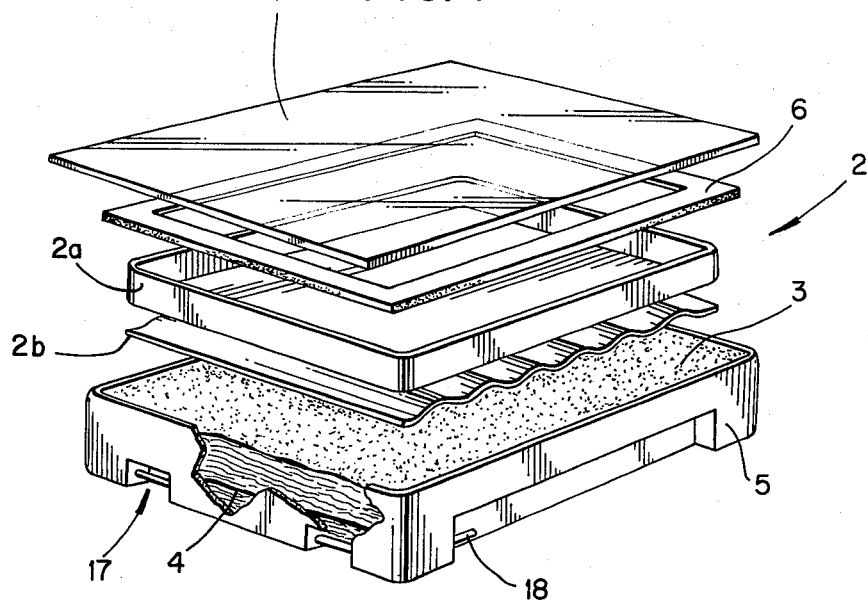
FIG. 1 is a partially broken away exploded perspective view of a solar collector unit according to the present invention.
Figure 2:
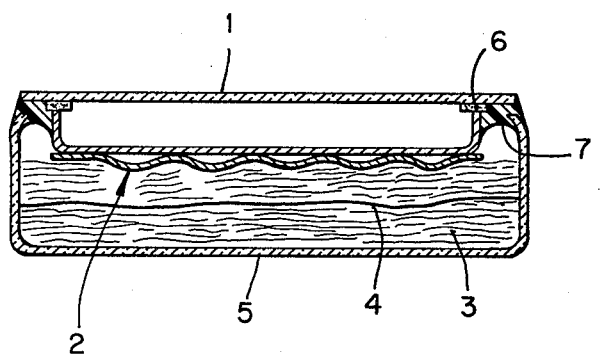
FIG. 2 is a cross-sectional view of such a unit when assembled.

Referring now to the drawings in greater detail, and first to the embodiment of FIGS. 1 and 2, there is shown a solar collector unit according to the present invention, comprising a transparent panel 1 of conventional material, e.g. glass or clear plastic, and a heat absorbing panel 2, with an insulation substrate 3 below the panel 2 and an aluminum film 4 embedded in substrate 3 for infra-red radiation reflection. A protective frame or casing 5 in an inert material such as hardened polyester resin, forms an airtight unit with the above components.

Absorber 2 consists of an element 2a shaped like a tray with upstanding edges, spot welded to a corrugated element 2b, the heat-carrying fluid, e.g. water, circulating as usual between these two elements. The material of panel 2 is conventional, e.g. stainless steel or other metal.

The upstanding edges of element 2a comprise a spacer on which glazing panel 1 rests and is sealed, by the thermally polymerized elastomer binder 6. A conventional polymerized monocomponent silicone cement 7 with substantial elasticity seals between casing 5 and panel 1. The space between glazing panel 1 and absorber 2 is thus sealed and cannot "sweat".

Figure 3:
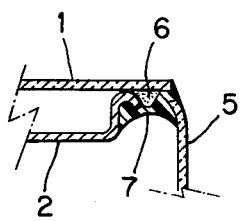
FIG. 3 is an enlarged fragmentary cross-sectional view of an edge portion of a modified form of such a unit.

FIG. 3 shows a modified form of joint construction between the panel 1, the absorber 2 and the casing 5. As is there shown, the edges of absorber 2 are rounded over outwardly and downwardly in order to improve the joint with panel 1 and hence the seal between panel 1 and absorber 2.

Turning now to FIG. 4, it will be seen that plural collector units according to the present invention can be assembled as desired. In this figure, two units A and B are assembled by means of a structure consisting of intermediate I-beams 8 between the panels, and framing E-beams 9 bordering the assembly. Incidentally, the individual solar collector units shown in FIG. 4 are different from that of FIG. 2, in that the casing 5 is not present as such but rather is replaced by a backing plate 10 which is interconnected with the absorber 2 by a silicone elastomer binder bordering the insulation material 3.

Units A and B are held in beams 8 and 9 by means of corner plates 11 secured to the sides of absorber 2 and fitting under the upper flange of I-beam 8 and the intermediate flange of E-beam 9.

Between adjacent collector units, the glazing panels are interconnected by a conventional silicone elastomer binder 12, preformed or not, and preferably colorless. Notice that the outer edges of the glazing panels 1 are also disposed in silicone elastomer binder between the upper and intermediate flanges of the E-beams 9.

FIG. 5 shows two collector units A' and B' of the FIG. 3 type. The corner plates 11 are omitted and the casings 5 are interconnected by inverted T-beams 15 between the units, and L-beams 16 which constitute framing sections.

Casings 5 can be interconnected with their respective intermediate and framing beams by removable clips (not shown) fitted into preformed recesses 17 (see FIG. 1) on the side edges of the frames 5.

Also, tubes 18 (FIGS. 1, 4 and 6) can be provided for carrying the heat exchange liquid through the units and to or from the space between the elements of the absorber 2. Appropriate flexible tubing (not shown) can be provided to interconnect the pipes 18 in a conventional manner.

From a consideration of the foregoing disclosure, therefore, it will be evident that the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A solar heating collector unit comprising a polygonal casing, a polygonal transparent panel closing one side of said casing, an insulation substrate disposed within the casing, a polygonal metal heat-absorbing panel having a polygonal upstanding marginal flange disposed within said casing between said insulation substrate and said transparent panel, said marginal flange extending continuously about all sides of said heat-absorbing panel and spacing said heat-absorbing panel from said transparent panel, a thermally polymerized elastomer forming a continuous polygonal peripheral joint between said transparent panel and said upstanding marginal flange and sealing said flange to said transparent panel in fluidtight relationship and securing said panels together, an inert gas sealed in the space between said panels by said elastomer, and means defining a path for heat exchange fluid against the side of said metal panel that is opposite said transparent panel.

2. A unit as claimed in claim 1, and a silicone cement between the outer side of the upper edge of said flange and the underside of the edge of said panel.

3. A unit as claimed in claim 2, in which said silicone cement extends between the casing and said flange and between the casing and said transparent panel.

4. A unit as claimed in claim 1, in which the edges of said flange are rounded over outwardly and downwardly in order to improve the joint with said transparent panel, said elastomer being disposed between said downwardly outwardly rounded edges and said transparent panel and an inert gas sealed in the space between said panels by said elastomer.

5. A unit as claimed in claim 1, in which said casing and panels and flange are rectangular.

* * * * *